United States Patent
Kamperschroer et al.

(10) Patent No.: US 6,539,033 B1
(45) Date of Patent: Mar. 25, 2003

(54) METHOD FOR THE TRANSMISSION OF DATA IN A HYBRID TELECOMMUNICATION SYSTEM, IN PARTICULAR AN "ISDN ⇆ DECT-SPECIFIC RLL/WLL" SYSTEM

(75) Inventors: Erich Kamperschroer, Hamminkeln (DE); Martin Kordsmeyer, Hörstel (DE)

(73) Assignee: Siemens AG, Munich (DE)

( * ) Notice: Subject to any disclaimer, the term of this patent is extended or adjusted under 35 U.S.C. 154(b) by 0 days.

(21) Appl. No.: 09/254,356

(22) PCT Filed: Sep. 9, 1997

(86) PCT No.: PCT/DE97/02003
§ 371 (c)(1),
(2), (4) Date: Mar. 4, 1999

(87) PCT Pub. No.: WO98/11759
PCT Pub. Date: Mar. 19, 1998

(30) Foreign Application Priority Data

Sep. 10, 1996 (DE) .......................................... 196 36 744

(51) Int. Cl.[7] ................................................ H04Q 7/20
(52) U.S. Cl. ...................................... 370/524; 455/450
(58) Field of Search ................................ 455/450, 426, 455/453, 446; 370/319, 320, 321, 335, 337, 342, 347, 465, 466, 524

(56) References Cited

U.S. PATENT DOCUMENTS

| | | | | |
|---|---|---|---|---|
| 5,204,857 A | * | 4/1993 | Obara | |
| 5,206,858 A | * | 4/1993 | Nakano et al. | |
| 5,463,628 A | | 10/1995 | Sorensen | |
| 6,175,738 B1 | * | 1/2001 | Flake et al. | 455/451 |
| 6,324,179 B1 | * | 11/2001 | Doshi et al. | 370/395 |
| 6,327,268 B1 | * | 12/2001 | Sipila | 370/465 |
| 6,332,080 B1 | * | 12/2001 | Kordsmeyer | 455/450 |

FOREIGN PATENT DOCUMENTS

| | | | |
|---|---|---|---|
| DE | 196 25 142 A1 | 10/1997 | |
| FI | 0 836 339 A2 | * 4/1998 | ............ H04Q/7/24 |
| WO | WO 93/21719 | 10/1993 | |

* cited by examiner

Primary Examiner—Ken Vanderpuye
(74) Attorney, Agent, or Firm—Bell, Boyd & Lloyd LLC

(57) ABSTRACT

In a hybrid telecommunication system, a varying volume of data is transmitted between message transmission planes of telecommunication interfaces of the hybrid telecommunication system, each case it is transmitted with the least transmission complexity in the message transmission planes and, in a singe coherent data block particularly when the varying volume of data exceeds a volume of data that can be maximally transmitted between identical message transmission planes of the telecommunication interfaces. A transmission plane-specific information element in dependence on the varying volume of data at least twice, one behind the other, is used for the transmission of the volume of data in the data block.

12 Claims, 10 Drawing Sheets

METHOD FOR THE TRANSMISSION OF DATA IN A HYBRID TELECOMMUNICATION SYSTEM, IN PARTICULAR AN "ISDN ⇆ DECT-SPECIFIC RLL/WLL" SYSTEM

BACKGROUND OF THE INVENTION

In telecommunication systems having a message transmission route between a message source and a message sink, transmitting and receiving devices are used for message processing and transmission, in which 1) the message processing and message transmission can be carried out in a preferred transmission direction (simplex operation) or in both transmission directions (duplex operation),
2) the message processing is analogue or digital,
3) the message transmission is wire-based over the trunk transmission route, or is carried out wire-free on the basis of various message transmission method FDMA (Frequency Division Multiple Access), TDMA (Time Division Multiple Access) and/or CDMA (Code Division Multiple Access)—for example in accordance with radio standards such as DECT, GSM, WACS or PACS, IS-54, PHS, PDC, etc. (cf. IEEE Communications Magazine, January 1995, pages 50 to 57; D. D. Falconer et al.: "Time Division Multiple Access Methods for Wireless Personal Communications").

"Message" is a generic term which covers both the useful content (information) and the physical representation (signal). Despite a message having the same useful content—that is to say the same information—different signal forms may occur. Thus, for example, a message relating to an object may be transmitted (1) in the form of an image,
(2) as the spoken word,
(3) as the written word,
(4) as an encrypted word or image.

The type of transmission in accordance with (1) ... (3) is in this case normally characterized by continuous (analogue) signals, while in the case of the transmission type according to (4), the signals are normally discontinuous (for example pulses, digital signals).

SUMMARY OF THE INVENTION

On the basis of this general definition of a message system, the invention relates to a method for the transmission of data in a hybrid telecommunication system in particular an "ISDN⇆DECT-specific RLL/WLL" system.

In general terms the present invention is a method for the transmission of data in a hybrid telecommunication system, in particular an "ISDN⇆DECT-specific RLL/WLL" system. The hybrid telecommunication system contains a first telecommunication subsystem and a second telecommunication subsystem. The second telecommunication subsystem has, for the purpose of transmitting first subsystem messages of the first telecommunication subsystem and for the purpose of transmitting second subsystem messages of the second telecommunication subsystem, a first telecommunication interface and a second telecommunication interface, each having a plurality of message transmission planes. The second telecommunication subsystem is incorporated via the telecommunication interfaces, as a local message transmission loop into the first telecommunications system. A first volume of data of the first subsystem messages which is to be transmitted between identical first message transmission planes of the telecommunication interfaces according to a transmission plane-specific transmission format is transmitted. The first volume of data exceeds a second volume of data that can be maximally transmitted by the transmission format. The first volume of data is transmitted in a single data block, which is transmitted between the message transmission planes, by using a transmission plane-specific information element as the transmission plane-specific format in dependence on the first volume of data at least twice, one behind the other, for the transmission of the first volume of data in the data block.

Advantageous developments of the present invention are as follows.

A repeat indicator is used for the at least double use of the information element.

The first telecommunication subsystem is an ISDN system.

The second telecommunication subsystem is: a DECT system; a GSM system; one of a PHS system, a WACS system or a PACS system; one of an "IS-54" system or a PDC system; one of a CDMA system, a TDMA system, an FDMA system or a (with regard to the transmission standards) hybrid system.

The first telecommunication interface is a DECT INTERMEDIATE FIXED SYSTEM and the second telecommunication interface is a DECT INTERMEDIATE PORTABLE SYSTEM.

The first volume of data is an "ISDN layer 3" volume of data.

The information element is the DECT-specific "IWU-to-IWU" element.

The first message transmission plane is the IWU layer according to the OSI/ISO layer model.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Hybrid telecommunication systems are, for example, varied—wire-free and/or wire-based—message systems containing telecommunication subsystems.

Figure 1:
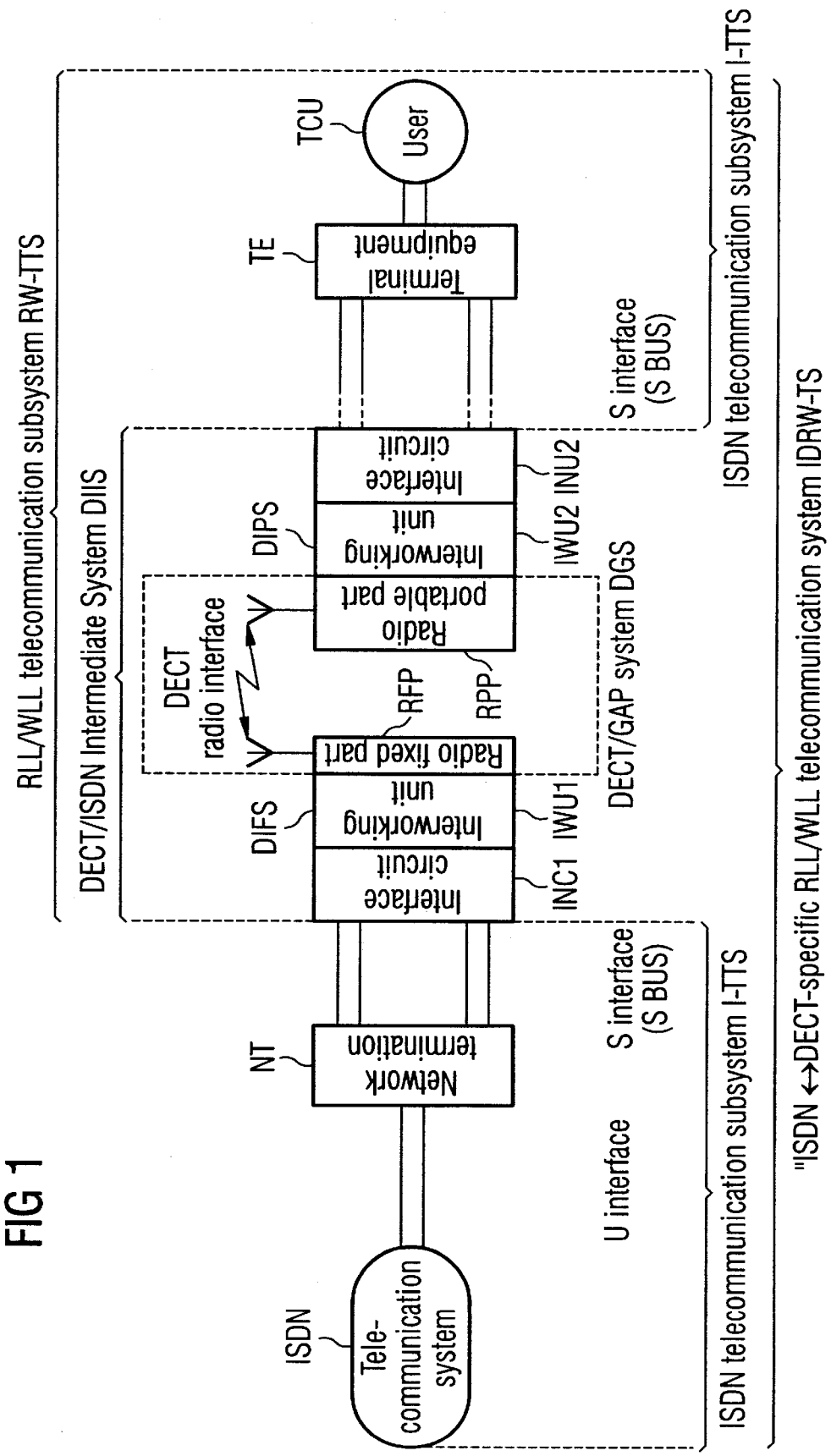
FIG. 1 depicts the basic structure of a hybrid telecommunication system in the form of a block circuit diagram.

Using as references the documents "Nachrichtentechnik Elektronik (Telecommunications Electronics), Berlin 45 (1995) Issue 1, pages 21 to 23 and Issue 3, pages 29–30" as well as IEE Colloquium 1993, 173; (1993), pages 29/1–29/7; W. Hing, F. Halsall: "Cordless access to the ISDN basic rate service", and on the basis of a DECT/ISDN Intermediate Systems DIIS according to ETSI publication prETS 300xxx, Version 1.09, Jul. 31, 1996. FIG. 1 shows—in a manner representative of the multiplicity of hybrid telecommunication systems—an "ISDN⇌DECT-specific RLL/WLL" Telecommunication System (Integrated Services Digital Network⇌Radio in the Local Loop/Wireless in the Local Loop) with an ISDN telecommunication subsystem I-TSS (cf. document "Nachrichtentechnik Elektronik (Telecommunications Electronic), Berlin 41–43, Parts: 1 to 10, Part 1: (1991) Issue 3, pages 99 to 102; Part 2: (1991) Issue 4, pages 138 to 143; Part 3: (1991) Issue 5, pages 179–182 and Issue 6, pages 219 to 220; Part 4: (1991) Issue 6, pages 220 to 222 and (1992) Issue 1, pages 19 to 20; Part 5: (1992) Issue 2, pages 59 to 62 and (1992) Issue 3, pages 99 to 102; Part 6: (1992) Issue 4, pages 150 to 153; Part 7: (1992) Issue 6, pages 238 to 241; Part 8: (1993) Issue 1, pages 29 to 33; Part 9: (1993) Issue 2, pages 95 to 97 and (1993) Issue 3, pages 129 to 135; Part 10: (1993) Issue 4, pages 187 to 190;") and a DECT-specific RLL/WLL Telecommunication Subsystem RW-TSS.

Figure 2:
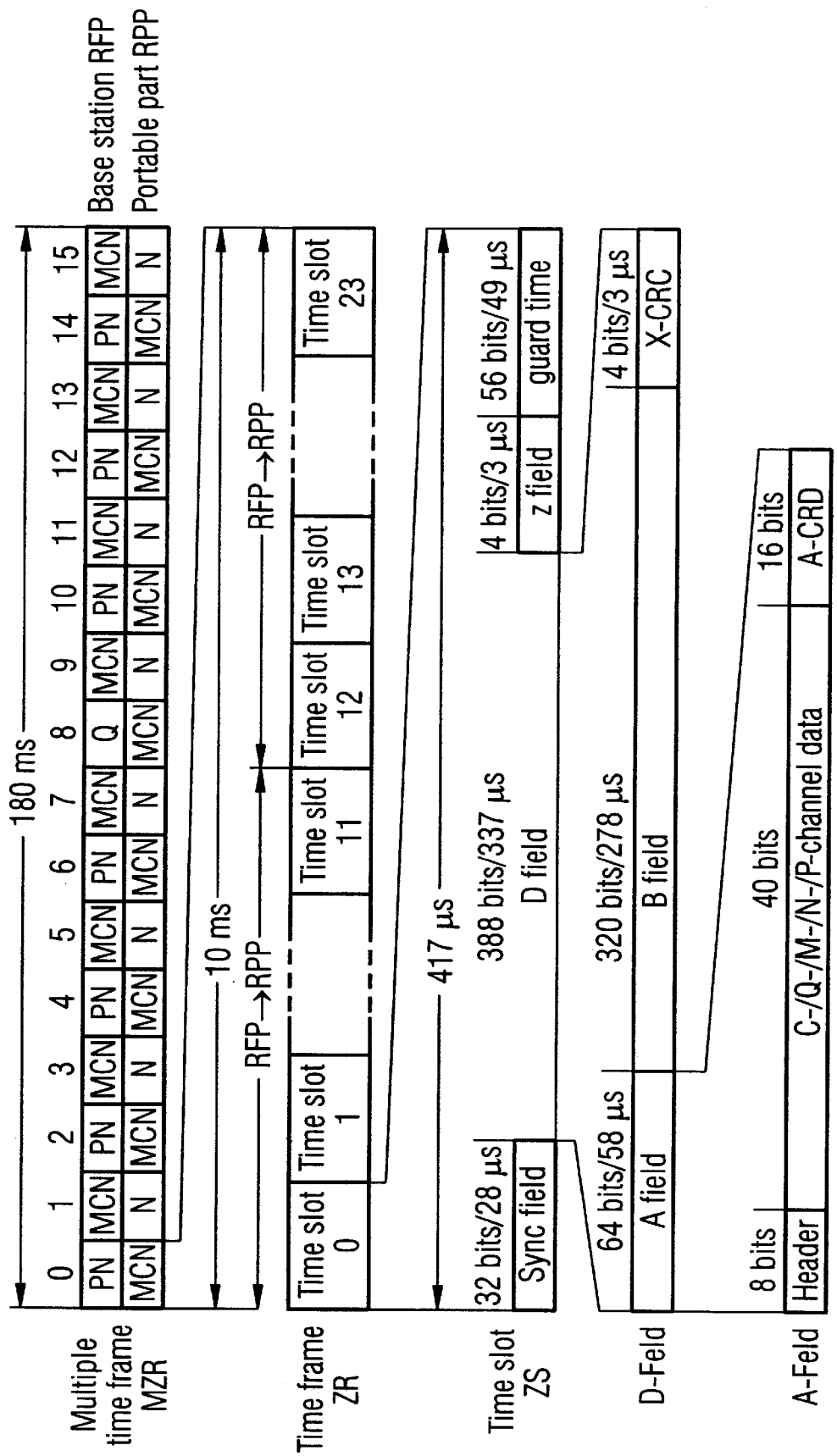
FIG. 2 depicts the time frame/time slot structure of a DECT system.
Figure 3:
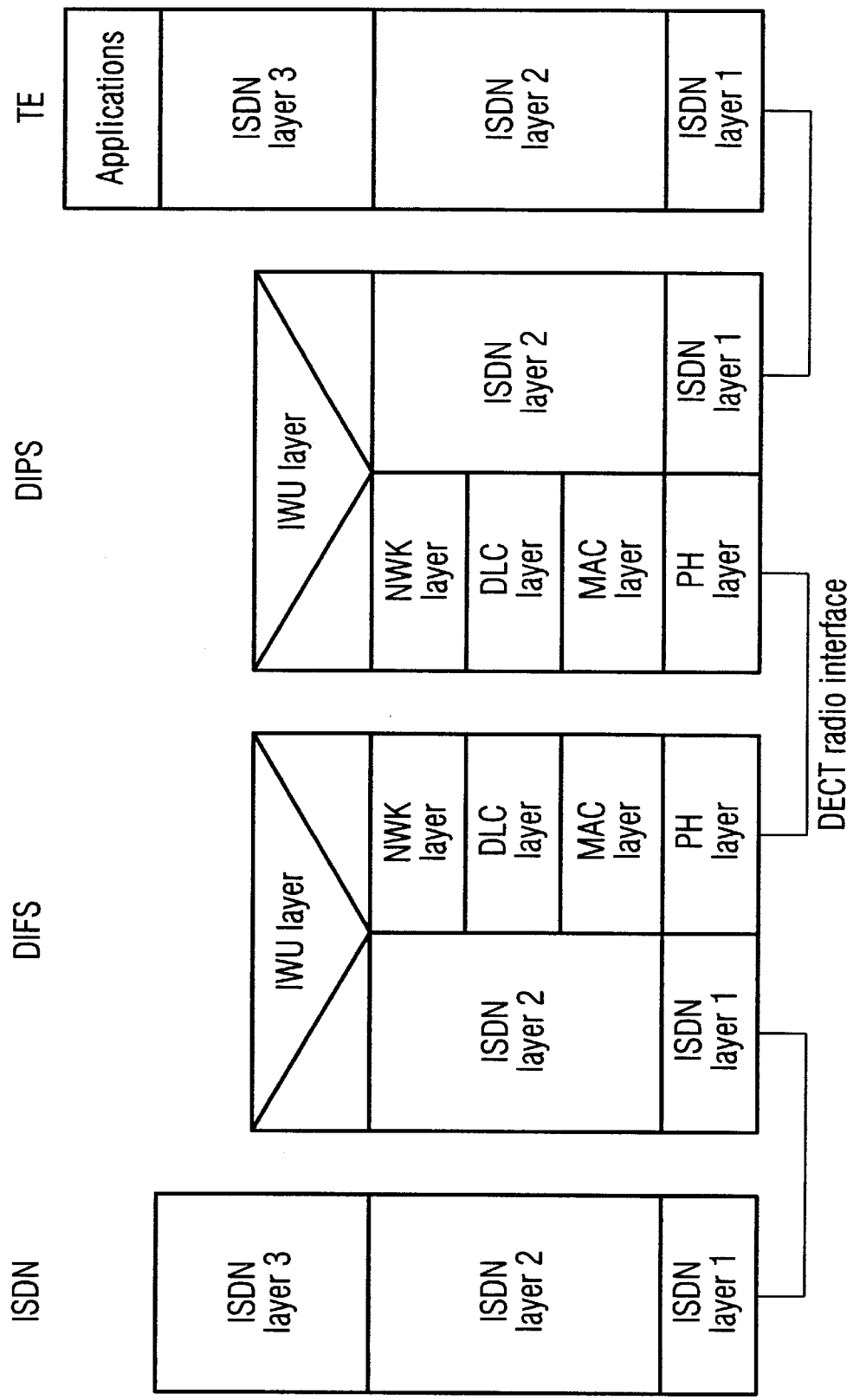
FIG. 3 depicts an OSI/ISO layer model for the C-level of the telecommunication system of FIG. 1.

The DECT/ISDN Intermediate System DIIS and the RLL/WLL telecommunication subsystem RW-TSS are in this case preferably based on a DECT/GAP system DGS (Digital Enhanced (previously: European) Cordless Telecommunication; cf. (1): Nachrichtentechnik Elektronik 42 (1992) January/February No. 1, Berlin, DE; U. Pilger "Struktur des DECT-Standards" (structure of the DECT standard) pages 23 to 29 in conjunction with the ETSI publication ETS 300175-1 . . . 9, October 1992; (2): Telecom Report 16 (1993), No. 1, J. H. Koch: "Digitaler Komfort für schnurlose Telekommunikation—DECT-Standard eröffnet neue Nutzungsgebiets" (Digital convenience for cordless telecommunication—DECT standard opens up new fields of application), pages 26 and 27; (3): tec 2/93—Das technische Magazin von Ascom "Wege zur universellen mobilen Telekommunikation" (The technical magazine from Ascom "Means for universal mobile telecommunication"), pages 35 to 42; (4): Philips Telecommunication Review Vol. 49, No. 3, September 1991, R. J. Mulder: "DECT, a universal cordless access system"; (5) WO 93/21719 (FIGS. 1 to 3 with associated description). The GAP standard (Generic Access Profile) is a subset of the DECT standard which as the task of ensuring interoperability of the DECT radio interface for telephone applications (cf. ETSI publication prETS 300444, April 1995).

The DECT/ISDN Intermediate System DIIS and the RLL/WLL telecommunication subsystem RW-TSS can alternatively be based on a GSM system (Groupe Spéciale Mobile or Global System for Mobile Communication; cf. Inoformatik Spektrum 14 (1991) June, No. 3, Berlin, DE; A. Mann: "Der GSM-Standard—Grundlage für digitale europaische Mobilfunknetze" (The GSM standard—Basis for digital European mobile radio networks), pages 137 to 152). Instead of this, it is also possible in the context of a hybrid telecommunication system for the ISDN telecommunication subsystem I-TSS to be designed as a GSM system.

Furthermore, further possible ways for realizing the DECT/ISDN Intermediate System DIIS, the RLL/WLL telecommunication subsystem RW-TSS or the ISDN telecommunication subsystem I-TTS include the systems mentioned in the introduction as well as future systems which are based on the known multiple access methods FDMA, TDMA, CDMA (Frequency Division Multiple Access, Time Division Multiple Access, Code Dibision Multiple Access) and hybrid multiple access methods formed from them.

The use of radio channels (for example DECT channels) in classical cable-based telecommunication systems, such as ISDN, is becoming increasingly important, particularly against the background of future alternative network operators without their own complete cable network.

Thus, for example in the case of the RLL/WLL telecommunication subsystem RW-TSS, the wire-free connection technology RLL/WLL (Radio in the Local Loop/Wireless in the Local Loop) for example including the DECT system DS, ISDN services should be made available to the ISDN subscriber on standard ISDN interfaces (cf. FIG. 1).

In the "ISDN⇌DECT-specific RLL/WLL" telecommunication system IDRW-TS according to FIG. 1, a telecommunication subscriber (user) TCU (TeleCommunication User) with terminal TE (Terminal Endpoint; Terminal Equipment), is included in the ISDN world, with the services available in it, for example via a standardized S interface (S-BUS), the DECT-ISDN Intermediate System DIIS, which is designed as a local message transmission loop—is preferably DECT-specific and is contained in the RLL/WLL telecommunication subsystem RW-TSS—(first telecommunication subsystem), a further standardized S interface (S-BUS), a Network Termination NT and a standardized U interface of the ISDN telecommunication subsystem I-TTS (second telecommunication subsystem).

The first telecommunication subsystem DIIS essentially comprises two telecommunication interfaces, a first telecommunication interface DIGS (DECT Intermediate Fixed System) and a second telecommunication interface DIPS (DECT Intermediate Portable System), which are connected to one another without wires, for example via a DECT radio interface. Because of the quasi-position-based first telecommunication interface DIGS, the first telecommunication subsystem DIIS forms the local message transmission loop defined above in this context. The first telecommunication interface DIFS contains a Radio Fixed Part RFP, an InterWorking Unit IWU1 and an Interface Circuit INC1 for the S interface. The second telecommunication interface DIPS contains a Radio Portable Part RPP and an InterWorking Unit IWU2 and an Interface Circuit INC2 for the S interface. The radio fixed part RFP and the radio portable part RPP in this case form the known DECT/GAP system DGS.

The following general problems exist for a DECT specific RLL system as a carrier for, as far as possible, all ISDN services in the subscriber connection:

a) simulation of the ISDN channel structure (D channel and 2 B channels), the D channel in particular in the following text, b) good bandwidth economy; particularly important for ISDN since some services already require two DECT channels for the B channel data rate of 64 kbps, c) minimum technical complexity.

Simulation of the D Channel

Characteristics of the D Channel

Common signaling channel on the C plane for all Terminal Endpoints TE connected to the ISDN connection.

The TE-specific signaling channels to the network are separated therein by TE-specific addresses TEI (Terminal Endpoint Identifier). The access mechanism to the D channel ensures the sequence of the messages on a TE-specific basis.

Throughput rate: 16 kbps

Utilization: dependent on a large number of criteria, as a rule lower than the maximum capacity; jam situations possible, although these can be cleared quickly because of the high capacity.

DECT Channels

Based on the document "Nachrichtentechnik Elektronik [Telecommunications electronics] 42 (1992) January/February, No. 1, Berlin, DE; U. Pilger; "Struktur des DECT-Standards (Structure of the DECT standard), pages 23 to 29, in conjunction with ETS 300175-1 . . . 9, October 1992", FIG. 2 shows the TDMA structure of the DECT/GAP system DGS. The DECT/GAP system is a hybrid system with respect to the multiple access methods, in which radio messages can be transmitted, using the FDMA principle, on ten frequencies in the frequency band between 1.88 and 1.90 Ghz and, using the TDMA principle according to FIG. 2, can be transmitted in a predetermined time sequence from the base station RFP to the base station RFP (duplex operation). The time sequence is in this case governed by a multiple time frame MZR, which occurs every 160 ms and has 16 time frames ZR, each having a time duration of 10 ms. Information items are transmitted separately in these time frames ZR to the base station RFP and the portable part RPP, these information items relating to a C, M, N, P, Q channel defined in the DECT standard. If information items for a number of these channels are transmitted in one time frame ZR, then the transmission is carried out on the basis of a priority list where M>C>N and P>N. Each of the 16 time frames ZR in the multiple time frame MZR is in turn split into 24 time slots ZS each having a time duration of 417 μs, of which 12 time slots ZS (time slots 0 . . . 11) are intended for the transmission direction "base station RFP→portable part RPP", and a further 12 time slots ZS (time slots 12 . . . 23) for the transmission direction "portable part RPP→base station RFP". In accordance with the DECT standard, information items with a bit length of 480 bits are transmitted in each of these time slots ZS. Of these 480 bits, 32 bits are transmitted as synchronization information in a SYNC field, and 388 bits as useful information in a D field. The remaining 60 bits are transmitted as additional information in a Z field and as protection information in a "guard time" field. The 388 bits in the D field which are transmitted as useful information are in turn split into a 64-bit long A field, a 320-bit long B field and a 4-bit long "X-CRC" word. The 64-bit long Z field is composed of an 8-bit long data header, a 40-bit long data set with data for the C, Q, M, N, P channels and a 16-bit long "A-CRC" word.

Characteristics

Use of TDMA time slots.

In principle one $C_s$ channel (s=slow) is used per time slot for signaling (C plane in the DECT standard], and one associated channel (U plane in the DECT standard) for the user or useful information (throughout: 32 kbps).

Throughput of the $C_s$ channel: 2 kbps.

The DECT standard also offers other channel structures, for example a $C_f$ channel (f=fast)

The $C_f$ channel occupies one time slot.

Throughput of the $C_f$ channel: 25.6 kbps.

On the basis of the OSI/ISO layer model (cf. (1); Information sheets—Deutsche Telkom Year 48, 2/1995, pages 102 to 111; (2): ETSI publication ETS 300175-1 ... 9, October 1992; (3): ETSI publication ETS 300102, February 1992; (4): ETSI publication ETS 300125, September 1991; (5): ETSI publication ETS 300012, April 1992), FIG. 3 shows a model of the C plane in the "ISDN⇌DECT-specific RLL/WLL" telecommunication system IDRW-TS according to FIG. 1.

Figure 4:
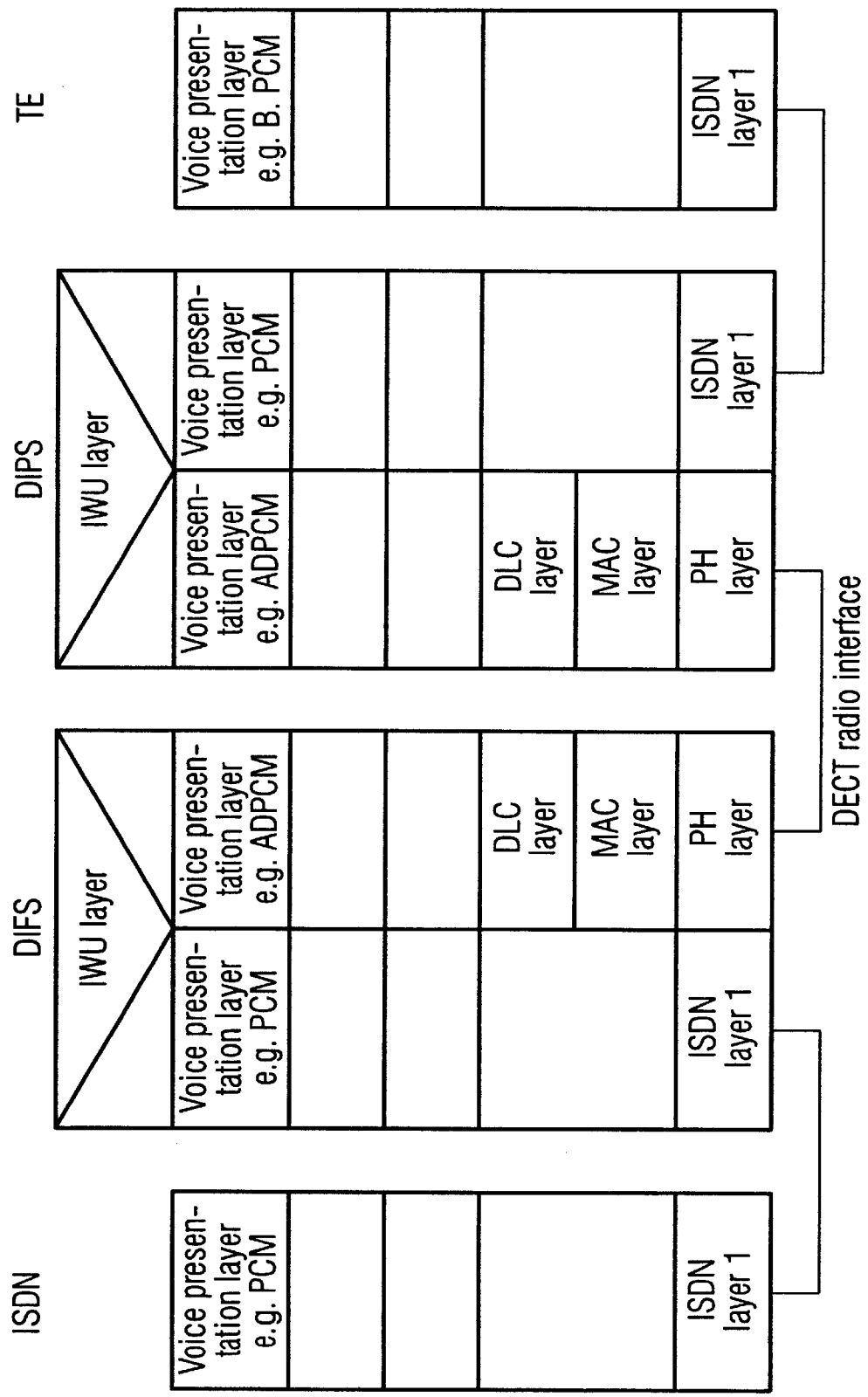
FIG. 4 depicts an OSI/ISO layer model for the U-level of the telecommunication system of FIG. 1.

On the basis of the OSI/ISO layer model (cf. (1); Information sheets—Deutsche Telekom Year 48, 2/1995, pages 102 to 111; (2): ETSI publication ETS 300175-1 . . . 9, October 1992; (3): ETSI publication ETS 300102, February 1992; (4): ETSI publication ETS 300125, September 1991; (5): ETSI publication ETS 300012, April 1992), FIG. 4 shows a model of the U plane for voice data transmission in the "ISDN⇌DECT-specific RLL/WLL" telecommunication system IDRW-TS according to FIG. 1.

Between the individual protocol layers (message transmission planes) of the telecommunication subsystem RLL/WLL according FIG. 3, it is subsequently necessary, given a terminated "ISDN layer 2", to transmit, for example, "ISDN layer 3" messages (referred to as ISDN 3 messages in the following text) of different length via the IWU protocol layer of the DECT Intermediate Fixed System DIFS to the IWU protocol layer of the DECT Intermediate Portable System DIPS ("logical" "IWU-to-IWU" transmission). For the "physical" transmission, the individual protocol layers of the telecommunication subsystem RLL/WLL according to FIG. 3 must be traversed in this case.

When ISDN messages are transmitted in a DECT-specific RLL/WLL system, a distinction is quite generally made between "short" ISDN messages, "medium" ISDM messages and "long" ISDN messages.

Figure 5:
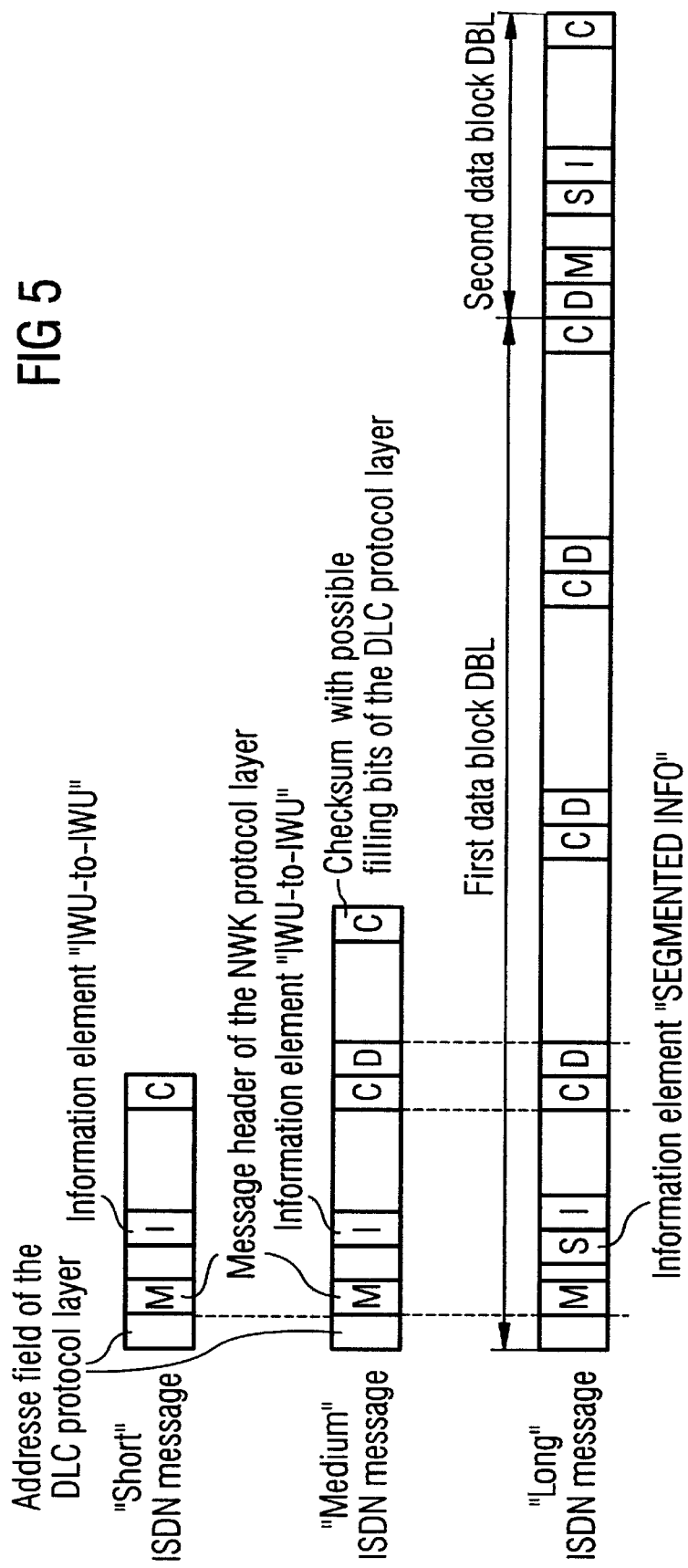
FIG. 5 depicts message structures of ISDN messages—for example ISDN3 messages—with different message lengths.

FIG. 5 shows the message structure specific to the "short" ISDN messages, "medium" ISDN messages and "long" ISDN messages, with which structures these messages are transmitted between the individual protocol layers (message transmission planes) of the telecommunication subsystem RLL/WLL. The message structure of the three ISDN messages comprises common structure elements except for one structure element. The common structure elements are an address field of the DLC protocol layer (D), a message header of the NWK protocol layer (M), a checksum with possible filling bits of the DLC protocol layer (C) and an information element "IWU-to-IWU" containing the data to be transmitted (I). The structure element that is not shared is an information element "SEGMENTED INFO" (S) which—as shown by FIG. 5—is used exclusively in the "long" ISDN messages.

Only the message structure of the "long" ISDN message is of interest below. In accordance with the definition, a "long" ISDN message is designated as "long" when it cannot be transmitted in a single "IWU-to-IWU" messages based on the information element "IWU-to-IWU" (cf. ETSI publication ETS specific 300175-5, October 1992, Chapter 7.7.23). In the present case, the "long" ISDN3 message with approximately 260 bit-octets or bytes is slightly bigger than the 248 bit-octets or bytes that can be maximally transmitted for instance with the information element "IWU-to-IWU".

In order, nevertheless, to be able to transmit such "long" ISDN messages, it is known to use the information element "SEGMENTED INFO" (cf. (1), ETSI publication 300xxx; Version 1.09; 31$^{st}$ July 1996; DECT/ISDN intermediate system, Chapter 6.5.1.5.; (2): ETSI publication ETS 300175-5, October 1992; Chapter 7.7.37). However, the consequence of using this information element is that the "long" ISDN3 message (ISDN3 data) is transmitted in two data blocks DBL with the common structure elements specified above in accordance with FIG. 5.

Figure 6:
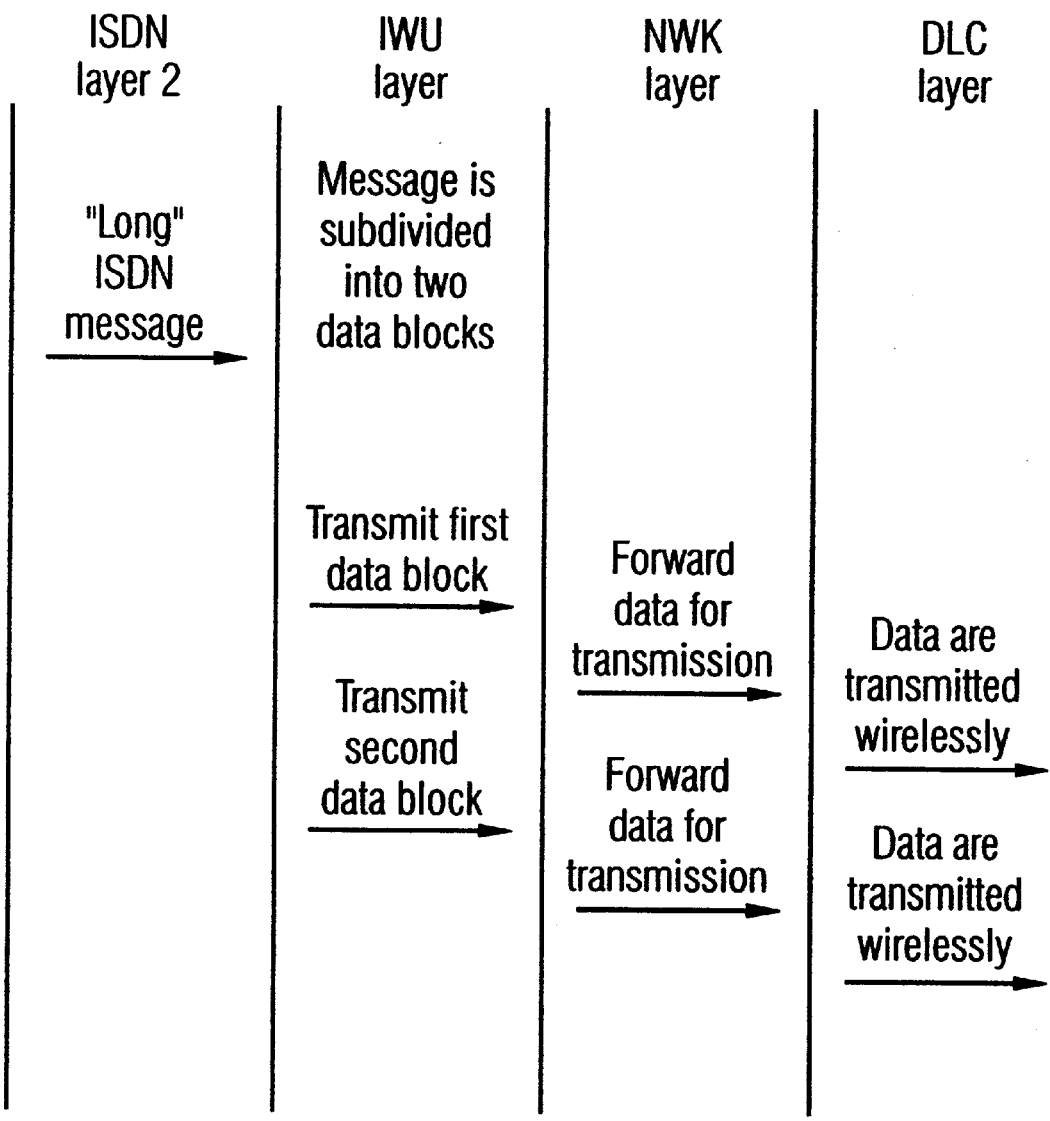
FIG. 6 depicts a message flowchart for the transmission of a "long" ISDN message, for example the "long" ISDN3 message, in transmission direction "DECT Intermediate Fixed System (DIFS)→DECT Intermediate Portable System (DIPS)" with the DIFS as transmitting station according to FIG. 5.
Figure 7:
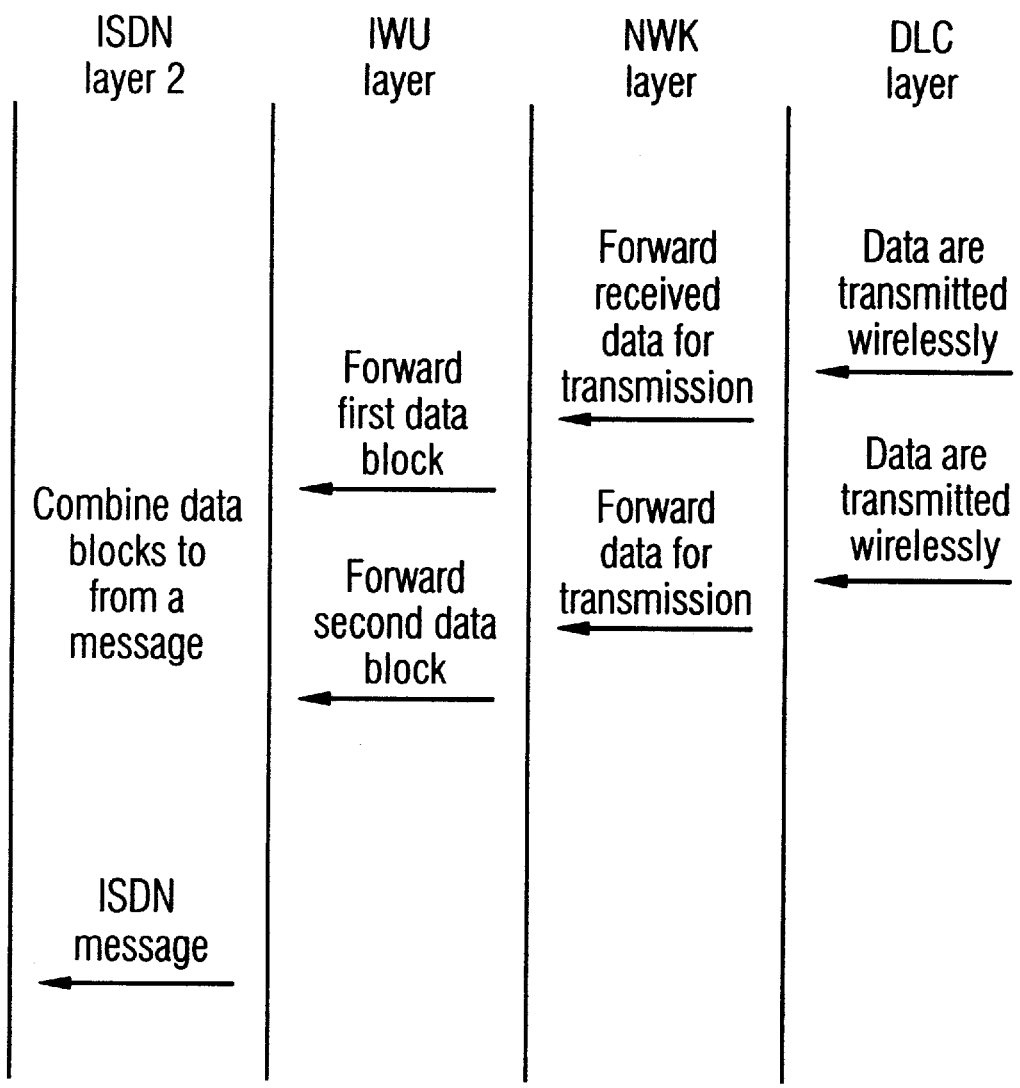
FIG. 7a depicts message flowchart for the transmission of a "long" ISDN message, for example the "long" ISDN3 message, in transmission direction "DECT Intermediate Fixed System (DIFS)→DECT Intermediate Portable System (DIPS)" with the DIPS as receiving station according to FIG. 5.

Taking FIGS. 3 and 5 as a departure point, FIGS. 6 and 7 show message flow diagrams for the transmitting direction "DECT Intermediate Fixed Systems (DIFS)→DECT Intermediate Portable Systems (DIPS)", which diagrams illustrate the transmission conditions in connection with the transmission of the ISDN3 message in the DIFS as transmitting station (FIG. 6; double underlining of DECT Intermediate Fixed Systems (DIFS)) and the transmission conditions in connection with the transmission of the ISDN3 message in the DIPS as receiving station (FIG. 7; double underlining of DECT Intermediate Fixed Systems (DIPS)). The same scenario is also possible for the reverse transmission direction "DECT Intermediate Portable Systems (DIPS)→DECT Intermediate Fixed Systems (DIFS)", if, unlike in the present case, the ISDN3 message is not a network-side message, but rather a terminal-side message.

According to FIG. 6, the "long" ISDN message—for example the "long" ISDN3 message—is transmitted from the "ISDN layer 2" to the IWU layer. In the IWU layer, these messages are divided into two data blocks, a first data block and a second data block, and the two data blocks are handed over to the NWK layer. The NWK layer forwards the data contained in the data blocks to the DLC layer. In the DLC layer, the data obtained from the NWK layer are transmitted over the air.

In the DECT Intermediate Portable System DIPS, according to FIG. 7, the data transmitted from the DECT Intermediate Fixed System DIFS transmitted over the air are received by the DLC layer and forwarded to the NWK layer. The NWK layer forwards these data to the IWU layer. In the IWU layer, these data are forwarded to the "ISDN layer 2" in a first data block and a second data block. In the "ISDN layer 2", the two data blocks are merged to form a message (ISDN message).

The transmission of the ISDN3 messages in the RLL/WLL system using the information element "SEGMENTED INFO" is unsatisfactory owing to the fact that the data have to be transmitted in two data blocks.

The object on which the invention is based consists in enabling, in a hybrid telecommunication system, in particular a "ISDN⇋DECT-specific RLL/WLL" system, a varying volume of data to be transmitted optimally between message transmission planes of telecommunication interfaces of the hybrid telecommunication system, in each case with the least transmission complexity in the message transmission planes.

The idea on which the invention is based consists in the fact that, in a telecommunication system having a telecommunication subsystem (hybrid telecommunication system) serving as a local message transmission loop, of the type specified in the introduction, the system-specific messages (data) to be transmitted in the telecommunication subsystem by local incorporation into the telecommunication system can be transmitted in a single coherent data block between message transmission planes of the telecommunication subsystem even when the system-specific volume of data exceeds a subsystem-specific volume of data that can be maximally transmitted between identical message transmission planes of the telecommunication subsystem.

Since only one data block is now necessary for the transmission, instead of a plurality of data blocks, on the one hand, in particular, the segmenting complexity in the respectively relevant message transmission plane decreases and on the other hand, in particular, the implementation of the message transmission planes becomes simpler.

Figure 8:
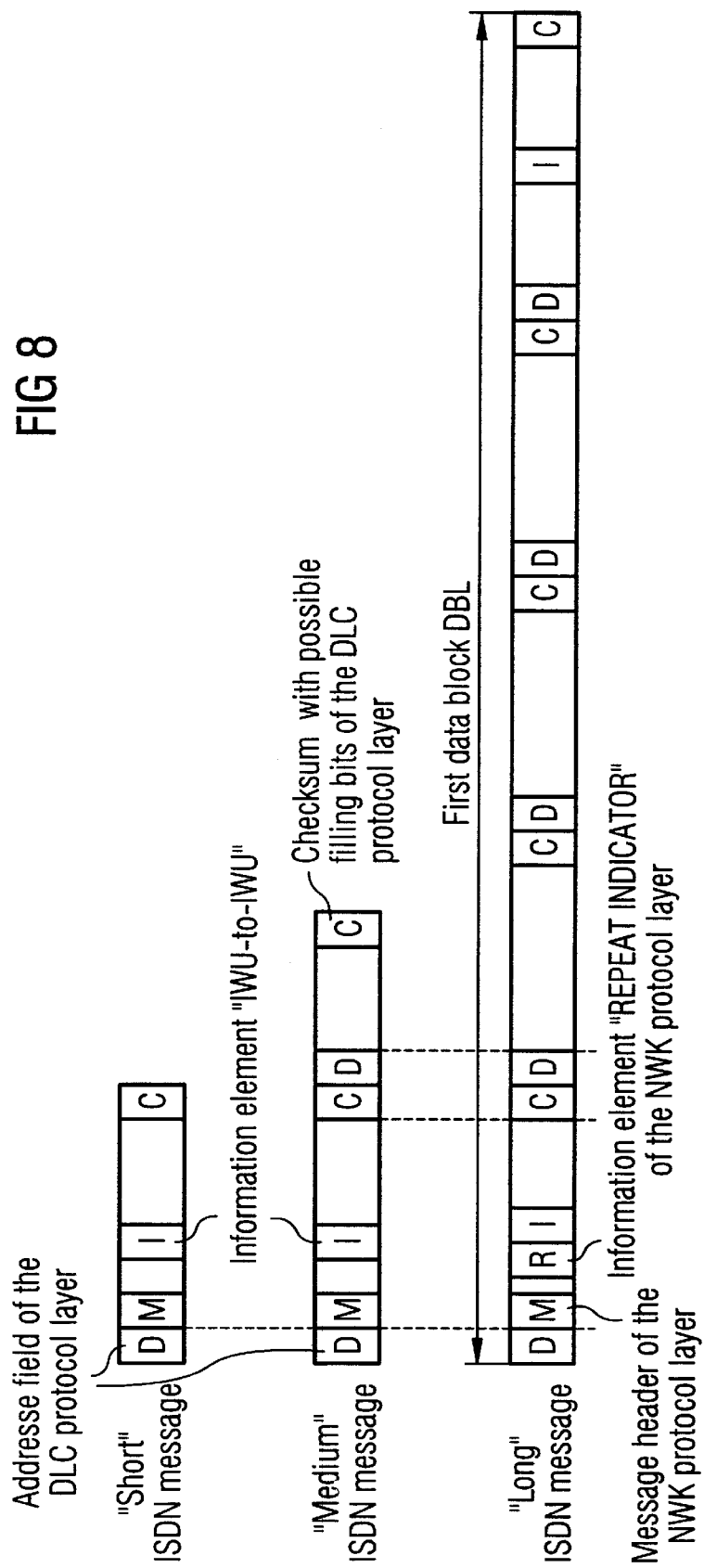
FIG. 8 depicts message structures of ISDN messages—for example ISDN3 messages—with different message lengths, whereby the message structure of the "long" ISDN message is modified compared to that in FIG. 5.

FIG. 8 depicts message structures of ISDN messages—for example ISDN3 messages—with different message lengths, whereby the message structure of the "long" ISDN message is modified compared to that in FIG. 5.

Figure 9:
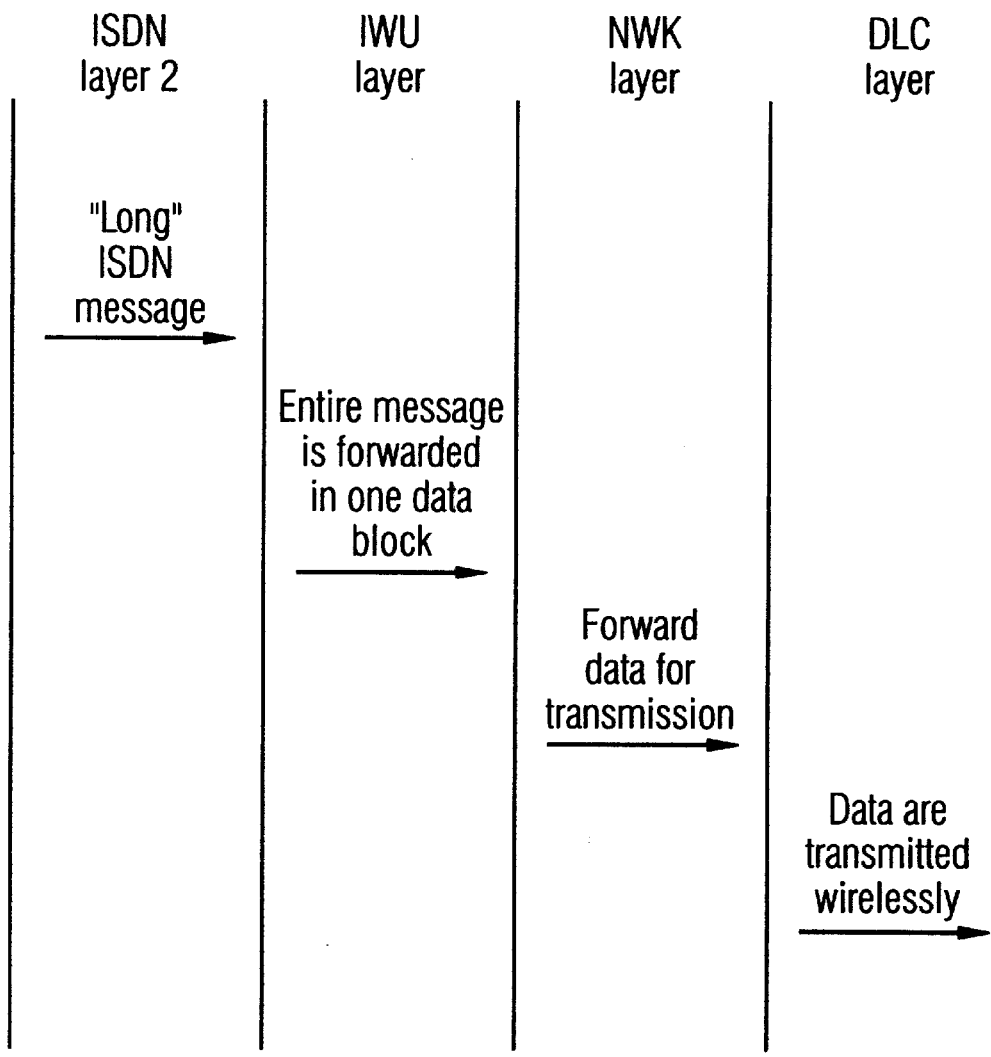
FIG. 9 depicts a message flowchart for the transmission of a "long" ISDN message, for example the "long" ISDN3 message, in transmission direction "DECT Intermediate Fixed System (DIFS)→DECT Intermediate Portable System (DIPS)" with the DIFS as transmitting station according to FIG. 8.

FIG. 9 is a message flowchart for the transmission of a "long" ISDN message, for example the "long" ISDN3 message, in transmission direction "DECT Intermediate Fixed System (DIFS)→DECT Intermediate Portable System (DIPS)" with the DIFS as transmitting station according to FIG. 8.

Figure 10:
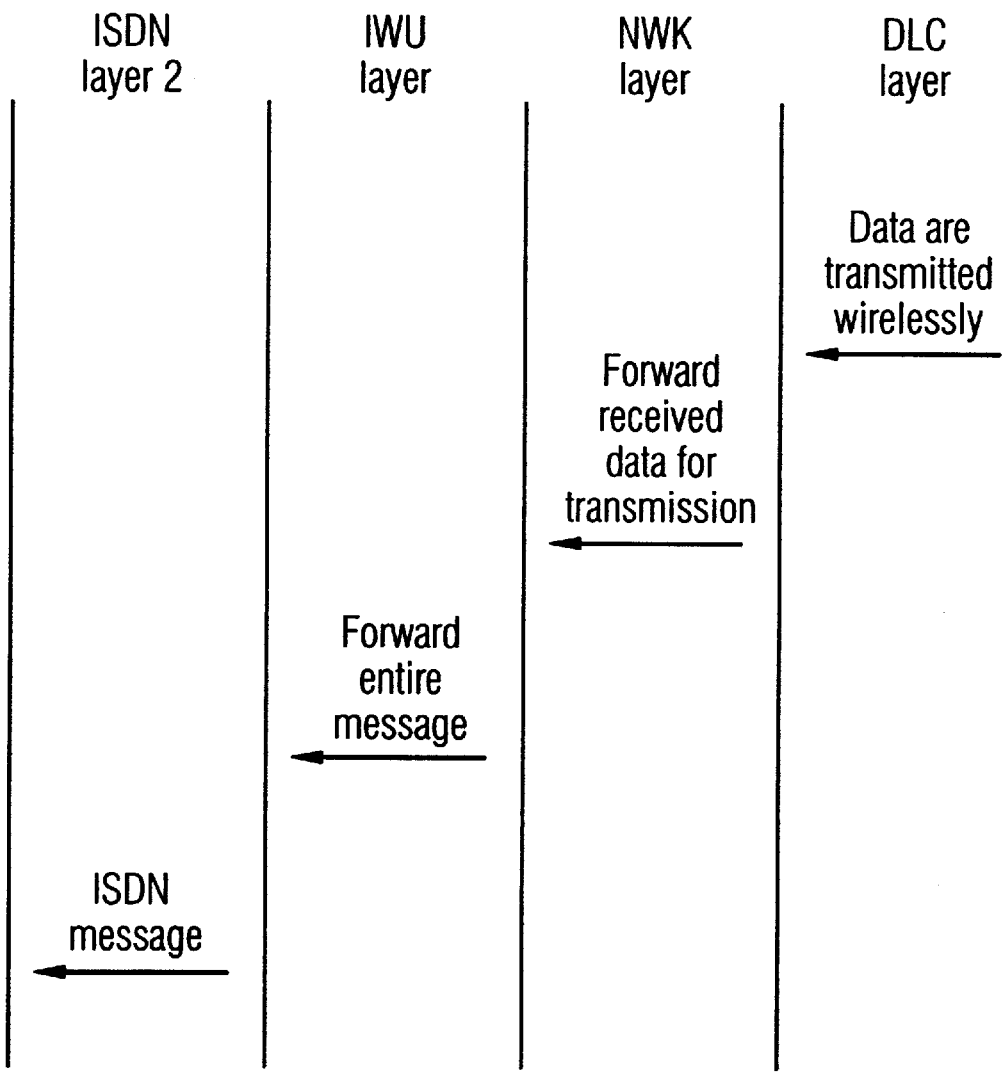
FIG. 10 depicts a message flowchart for the transmission of a "long" ISDN message, for example the "long" ISDN3 message, in transmission direction "DECT Intermediate Fixed System (DIFS)→DECT Intermediate Portable System (DIPS)" with the DIPS as receiving station according to FIG. 8.

FIG. 10 is a message flowchart for the transmission of a "long" ISDN message, for example the "long" ISDN3 message, in transmission direction "DECT Intermediate Fixed System (DIFS)→DECT Intermediate Portable System (DIPS)" with the DIPS as receiving station according to FIG. 8.

Taking FIG. 5 as a departure point, FIG. 8 shows a modified message structure for "long" ISDN messages, with which structure these messages are transmitted between the individual protocol layers (message transmission planes) of the telecommunication subsystem RLL/WLL according to FIG. 3. Instead of the information element "SEGMENTED INFO", an information element which is likewise defined in the DECT standard (cf. ETSI publication ETS 300175-5, October 1992, Chapter 7.6.3), the information element "REPEAT INDICATOR", is used. The consequence of using the information element "REPEAT INDICATOR" is that the "long" ISDN3 message can be transmitted in a single data block DBL. The information element "REPEAT INDICATOR" specifies the placing one behind the other—in the present case—of two information elements "IWU-to-IWU" in a single data block. Compared with the solution using the information element 'SEGMENTED INFO", the use of the repeat indicator (information element 'REPEAT INDICATOR") results in the segmentation complexity in the IWU protocol layer decreasing and the implementation of the DLC protocol layer becoming simpler. Furthermore, the use of the repeat indicator produces a smaller overhead of data because the bit length of the information element "REPEAT INDICATOR" is less than that of the information element "SEGMENTED INFO" and, moreover, the structure element "message header of the NWK protocol layer (M)" which is additionally required when using the information element "SEGMENTED INFO" is omitted.

Taking FIGS. 6 to 8 as a departure point, FIGS. 9 and 10 show message flow diagrams for the transmitting direction "DECT Intermediate Fixed Systems (DIGS)→DECT Intermediate Portable Systems (DIPS)", which diagrams illustrate the transmission conditions in connection with the transmission of the ISDN3 message in the DIFS as transmitting station (FIG. 9; double underlining of DECT Intermediate Fixed Systems (DIFS)) and the transmission conditions in connection with the transmission of the ISDN3 message in the DIPS as receiving station (FIG. 10; double underlining of DECT Intermediate Fixed Systems (DIPS)). In this case, once again, the same scenario is also possible for the reverse transmission direction "DECT Intermediate Portable Systems (DIPS)→DECT Intermediate Fixed Systems (DIFS)", if, unlike in the present case, the ISDN3 message is not a network-side message, but rather a terminal-side message.

According to FIG. 9, the "long" ISDN message—for example the "long ISDN3 message—is transmitted from the "ISDN layer" to the IWU layer in the DECT Intermediate Fixed System DIFS. In the IWU layer, this message is forwarded to the NWK layer as an entire message in one data block. The NWK layer forwards the data contained in the data block to the DLC layer. In the DLC layer, the data obtained from the NWK layer are transmitted over the air.

In the DECT Intermediate Portable System DIPS, according to FIG. 10, the data transmitted from the DECT Intermediate Fixed System DIFS over the air are received by the DLC layer and forwarded to the NWK layer. The NWK layer forwards these data to the IWU layer. In the IWU layer, these data are forwarded to the "ISDN layer 2" as an entire message. In the "ISDN layer 2", this message is forwarded as ISDN message.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for transmission of data in a hybrid telecommunication system, the hybrid telecommunication system containing a first telecommunication subsystem and a second telecommunication subsystem, the second telecommunication subsystem having a first telecommunication interface for transmitting first subsystem messages of the first telecommunication subsystem and a second telecommunication interface for transmitting second subsystem messages of the second telecommunication subsystem, each of the interfaces having a plurality of message transmission planes, where the second telecommunication subsystem is incorporated as a local message transmission loop into the first telecommunication system via the telecommunication interfaces, the method comprising the steps of:

generating a first volume of data associated with the first subsystem messages which is to be transmitted between identical first message transmission planes of the telecommunication interfaces according to a transmission plane-specific transmission format, wherein the first volume of data exceeds a second volume of data, which represents the maximum volume of data that can be transmitted by the transmission format; and transmitting the first volume of data in a single data block, which is transmitted between the first message transmission planes, by using a transmission plane-specific information element as the transmission plane-specific format in dependence on the first volume of data in the data block.

2. The method according to claim 1, wherein a repeat indicator is used for at least double use of the information element.

3. The method according to claim 1, wherein the first telecommunication subsystem is an ISDN system.

4. The method according to claim 1, wherein the second telecommunication subsystem is a DECT system.

5. The method according to claim 1, wherein the second telecommunication subsystem is a GSM system.

6. The method according to claim 1, wherein the second telecommunication subsystem is one of a PHS system, a WACS system or a PACS system.

7. The method according to claim 1, wherein the second telecommunication subsystem is one of an "IS-54" system or a PDC system.

8. The method according to claim 1, wherein the second telecommunication subsystem is one of a CDMA system, a TDMA system, an FDMA system or a, with regard to said transmission standards, hybrid system.

9. The method according to claim 1, wherein, the first telecommunication interface is a DECT INTERMEDIATE FIXED SYSTEM and the second telecommunication interface is a DECT INTERMEDIATE PORTABLE SYSTEM.

10. The method according to claim 3, wherein the first volume of data is an "ISDN layer 3" volume of data.

11. The method according to claim 4, wherein the information element is a DECT-specific "IWU-to-IWU" element.

12. The method according to claim 1, wherein the first message transmission plane is an IWU layer according to a OSI/ISO layer model.

* * * * *